United States Patent
Kawabata

(10) Patent No.: US 8,647,158 B2
(45) Date of Patent: Feb. 11, 2014

(54) DEVICE FOR MOUNTING PROTECTOR ON DIN RAIL

(75) Inventor: Tsuyoshi Kawabata, Tokyo (JP)

(73) Assignee: Sankosha Corporation, Tokyo (JP)

( * ) Notice: Subject to any disclaimer, the term of this patent is extended or adjusted under 35 U.S.C. 154(b) by 58 days.

(21) Appl. No.: 13/493,183

(22) Filed: Jun. 11, 2012

(65) Prior Publication Data
US 2013/0260605 A1  Oct. 3, 2013

(30) Foreign Application Priority Data
Mar. 29, 2012 (JP) .................................. 2012-75361

(51) Int. Cl.
*H01R 9/26* (2006.01)
(52) U.S. Cl.
USPC ........................................................ 439/716
(58) Field of Classification Search
USPC .................................... 439/716, 94
See application file for complete search history.

(56) References Cited

U.S. PATENT DOCUMENTS

| | | | | |
|---|---|---|---|---|
| 5,135,415 A | * | 8/1992 | Huber | 439/716 |
| 5,180,318 A | * | 1/1993 | Moller et al. | 439/716 |
| 5,848,917 A | * | 12/1998 | Bechaz et al. | 439/716 |
| 5,928,008 A | * | 7/1999 | Munshi | 439/94 |
| 7,575,484 B2 | * | 8/2009 | Van Der Mee et al. | 439/716 |

* cited by examiner

*Primary Examiner* — Phuong Dinh
(74) *Attorney, Agent, or Firm* — Westerman, Hattori, Daniels & Adrian, LLP

(57) ABSTRACT

A cam pin provided so as to project from a tip portion of an elastic tongue piece formed on a base unit of a protector S is inserted into a cam groove of a cam member disposed between the base unit and an operation member, and the operation member is moved in a direction in which the operation member moves away from or closer to a lower horizontal portion of the base unit to move the cam member, thus moving the cam pin between a locked position at which the cam pin a is positioned near a boundary between a inclined groove portion and a parallel groove portion of the cam groove of the cam member to inhibit the protector from being disengaged from a DIN rail and a unlocked position.

11 Claims, 16 Drawing Sheets

DEVICE FOR MOUNTING PROTECTOR ON DIN RAIL

FIELD OF THE INVENTION

The present invention relates to a device for mounting, on a DIN rail, a protector including a surge protection unit and a base unit.

BACKGROUND OF THE INVENTION

WO 2007/093572 A1 describes a device for mounting a protector on a DIN rail, comprising a fixed locking projecting portion fixedly formed on one of opposite sidewalls of a fitting recess portion of a base unit forming the protector into which recess portion the DIN rail is fitted, and a movable locking member disposed on the other of the opposite sidewalls and which is movable in a direction in which the movable locking member approaches or leaves the fixed locking projecting portion, wherein the protector is mounted on the DIN rail by locking an upper-end locking vertical portion of the DIN rail on the fixed locking projecting portion, then moving the movable locking member in the direction in which the movable locking member leaves the fixed locking projecting portion, then fitting the DIN rail into the fitting recess portion, and thereafter moving the movable locking member closer toward the fixed locking projecting portion.

SUMMARY OF THE INVENTION

Problems to be Solved by the Invention

In the device for mounting the protector on the DIN rail which device is described in WO 2007/093572 A1, the movable looking member is moved in the direction in which the movable locking member leaves the fixed locking projecting portion when the protector is removed from the DIN rail. In this case, during an operation of removing the protector, an operator has to hold the movable locking member by one hand so as to prevent the movable locking member from moving closer toward the fixed locking projecting portion, while removing the protector from the DIN rail by the other hand. Thus, the device is disadvantageous in that the operation of removing the protector from the DIN rail is difficult.

An object of the present invention is to solve the problem of the above-described conventional device for mounting the protector on the DIN rail.

To accomplish the above-described object, the present invention is configured as follows. First, a cam pin s9a provided so as to project from a tip portion of an elastic tongue piece s9 formed on a base unit S2 of a protector S is inserted into a cam groove C1 of a cam member C disposed between the base unit S2 and an operation member H, and the operation member H is moved in a direction in which the operation member H moves away from or closer to a lower horizontal portion s3 of the base unit S2 to move the cam member C, thus moving the cam pin s9a between a locked position at which the cam pin s9a is positioned near a boundary between a inclined groove portion c3 and a parallel groove portion c2 of the cam groove C1 of the cam member C to inhibit the protector S from being disengaged from a DIN rail R and a unlocked position at which the cam pin s9a is positioned on a central bottom surface c5a of a V-shaped coupling groove portion c5 of the cam groove C1 of the cam member C to enable the protector S to be disengaged from the DIN rail R. Second, by means of a mechanism in which when the cam pin s9a provided so as to project from the tip portion of the elastic tongue piece s9 formed on the base unit S2 of the protector S is inserted into the cam groove C1 of the cam member C disposed between the base unit S2 and the operation, member H and the operation member H is moved in the direction in which the operation member H moves away from or closer to the lower horizontal portion s3 of the base unit S2, then the cam member C moves and the cam pin s9a moves in one direction along the cam groove C1 of the cam member C in a circling manner, the operation member H can be held at the unlocked position, at which the protector can be disengaged from the DIN rail R. Third, a guide projection c1d formed on the cam member C is fitted into a guide slit h3 formed in a planar portion h1 of the operation member H. Fourth, a coil sprig receiving piece h5 of the operation member H is arranged at an upper end of a coil spring E compressively accommodated in a coil, spring accommodating portion s6. Fifth, a guide piece h4 formed on the operation member H is inserted into a guide recess portion s7c formed by a vertical surface s5b of the base unit S2 of the protector S and a vertical piece s7a and a parallel piece s7b of an engagement portion s7 formed on the vertical surface s5b.

The present invention is configured as described above and can thus exert the following effects.

As described above, the cam pin s9a provided so as to project from the tip portion of the elastic tongue piece s9 formed on the base unit 82 of the protect or S is inserted into the cam groove C1 of the cam member C disposed between the base unit S2 and the operation member H, and the operation member H is moved in the direction in which the operation member H moves away from or closer to the lower horizontal portion s3 of the base unit S2 to move the cm member C, thus moving the cam pin s9a between, the locked position at which the cam pin s9a is positioned near the boundary between the inclined groove portion c3 and the parallel groove portion c2 of the cam groove C1 of the caw number C to inhibit, the protector S from being disengaged, from the DIN rail R and the unlocked position at which the cam pin s9a is positioned on the central bottom surface c5a of the V-shaped coupling groove portion c5 of the cam groove C1 of the cam member C to enable the protector S to be disengaged from the DIN rail R. Hence, at the unlocked position where the protector S can be disengaged from the DIN rail R, the cam pin s9a is prevented from slipping out from the central bottom surface c5a of the V-shaped coupling groove portion c5 of the cam groove C1 of the cam member C. Therefore, the operation of removing the protector S from the DIN rail R can be easily and quickly performed without the need to operate the operation member H.

Furthermore, by means of the mechanism in which when the cam pin s9a provided so as to project from the tip portion of the elastic tongue piece s9 formed on the base unit S2 of the protector S is inserted into the cam groove C1 of the cam member C disposed between the base unit S2 and the operation member H, and the operation member H is moved in the direction in which the operation member H moves away from or closer to the lower horizontal portion s3 of the base unit S2, then the cam member C moves and the cam pin s9a moves in one direction along the cam groove C1 of the cam member C in a circling manner, the operation member H can be held at the unlocked position at which the protector can be disengaged from the DIN rail R. Thus, the operation of removing the protector S from the DIN rail R can be easily and quickly performed without the need to operate the operation member H.

Moreover, the guide projection c1d formed on the cam member C is fitted into the guide slit h3 formed in the planar portion h1 of the operation member H. Thus, the cam member C can be smoothly and stably moved toward each of opposite long-side sidewall portions h2 of the operation member H.

Additionally, the coil sprig receiving piece h5 of the operation member H is arranged at the upper end of the coil spring E compressively accommodated in the coil spring accommodating portion s6. Hence, the operation member H can be smoothly moved, thus improving the operability of the operation member H.

Moreover, the guide piece h4 formed on the operation member H is inserted into the guide recess portion s7c formed by the vertical surface s5b of the base unit S2 of the protector S and the vertical piece s7a and the parallel piece s7b of the engagement portion s7 formed on the vertical surface s5b. Thus, the operation member H can be smoothly and stably moved.

DETAILED DESCRIPTION OF THE PREFERRED EMBODIMENTS

An embodiment of the present invention will be described below. However, the present invention is not limited to the embodiment unless the scope of the spirits of the present invention is exceeded.

Figure 1:
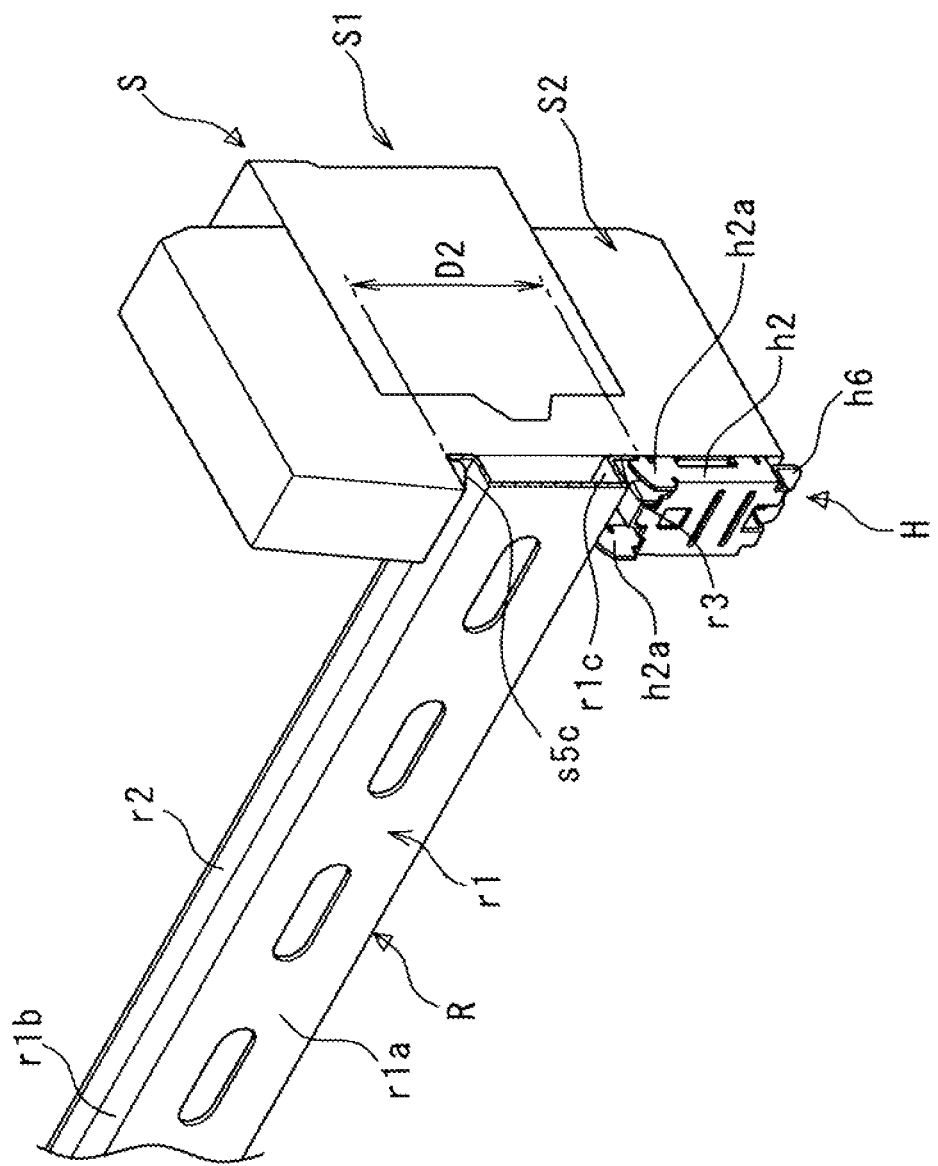
FIG. 1 is a perspective view of a device for mounting a protector on a DIN rail according to the present invention.

First, a general configuration of a device for mounting a protector S on a DIN rail R will be described below with reference to FIGS. 1, 2, and 13.

The protector S includes a surge protection unit S1 and a base unit S2 with a fitting recess portion S2' into which the surge protection unit S1 is fitted.

Furthermore, the DIN rail R includes a rail main body r1 with a substantially C-shaped cross section that is perpendicular to a longitudinal direction of the DIN rail R. The rail main body r1 includes a vertical portion r1a, an upper horizontal portion r1b extending from an upper end of the vertical portion r1a in the horizontal direction, and a lower horizontal portion r1c extending from a lower end of the vertical portion r1a in the horizontal direction. Moreover, an upper vertical locking portion r2 perpendicular to the upper horizontal portion r1b is formed at a tip of the upper horizontal portion r1b of the rail main body r1. Additionally, a lower vertical locking portion r3 perpendicular to the lower horizontal portion r1c is formed at a tip of the lower horizontal portion r1c of the rail main body r1. The upper vertical locking portion r2 and the lower vertical locking portion r3 extend so as to leave each other.

Figure 2:
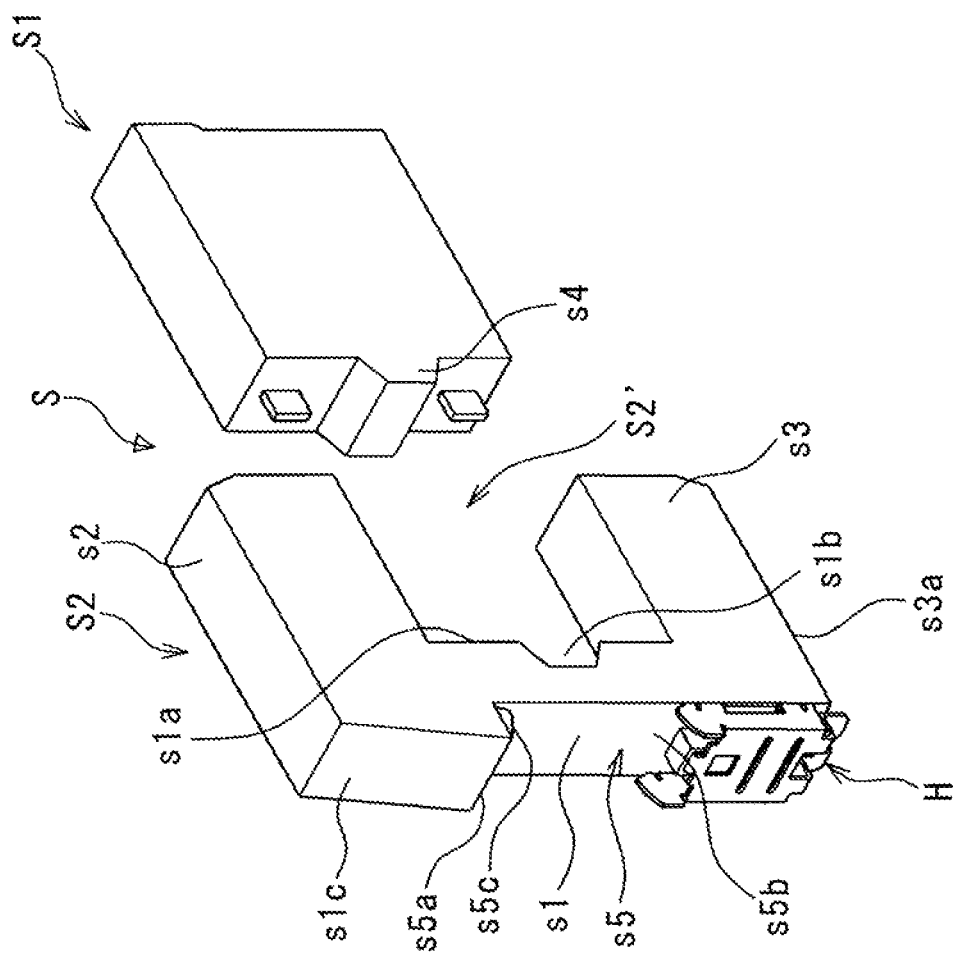
FIG. 2 is an exploded perspective view of the protector according to the present invention.

As shown in FIG. 2, as is well-known, the base unit S2 forming the protector S includes a vertical portion s1, an upper horizontal portion s2 extending from an upper part of the vertical portion s1 and a lower horizontal portion s3 extending from a lower part of the vertical portion s1. The vertical portion s1 and the pair of the upper horizontal portion s2 and the lower horizontal portion s3, which lie opposite each other, form the fitting recess portion S2', into which the surge protection unit S1 is fitted. Furthermore, a recess portion s1b is formed in a central part of a side surface s1a of the vertical portion s1 positioned on the side of the fitting recess portion S2' (the side surface s1a is hereinafter simply referred to as a fitting recess portion-side side surface) so that a fitting protruding portion s4 provided so as to project from a central portion of a side surface of the surge protection unit S1 positioned on the side of the fitting recess portion S2' is fitted into the recess portion s1b.

Furthermore, as shown in FIG. 2, a step portion s5 formed of an upper end horizontal surface s5a and a vertical surface s5b is provided on a side surface s1c of the vertical portion S1 positioned on the outer side of the fitting recess portion S2' (the side surface s1c is hereinafter simply referred to as an outer side surface); the step portion s5 is formed by removing an outer side surface s1c so as to leave a part of the outer side surface s1c positioned on the side of the upper horizontal portion s2. Such a fixed locking projecting portion s5c as forms a gap into which the upper vertical locking portion r2 of the DIN rail R can be inserted is suspended from the upper horizontal, surface s5a forming the step portion s5.

Figure 3:
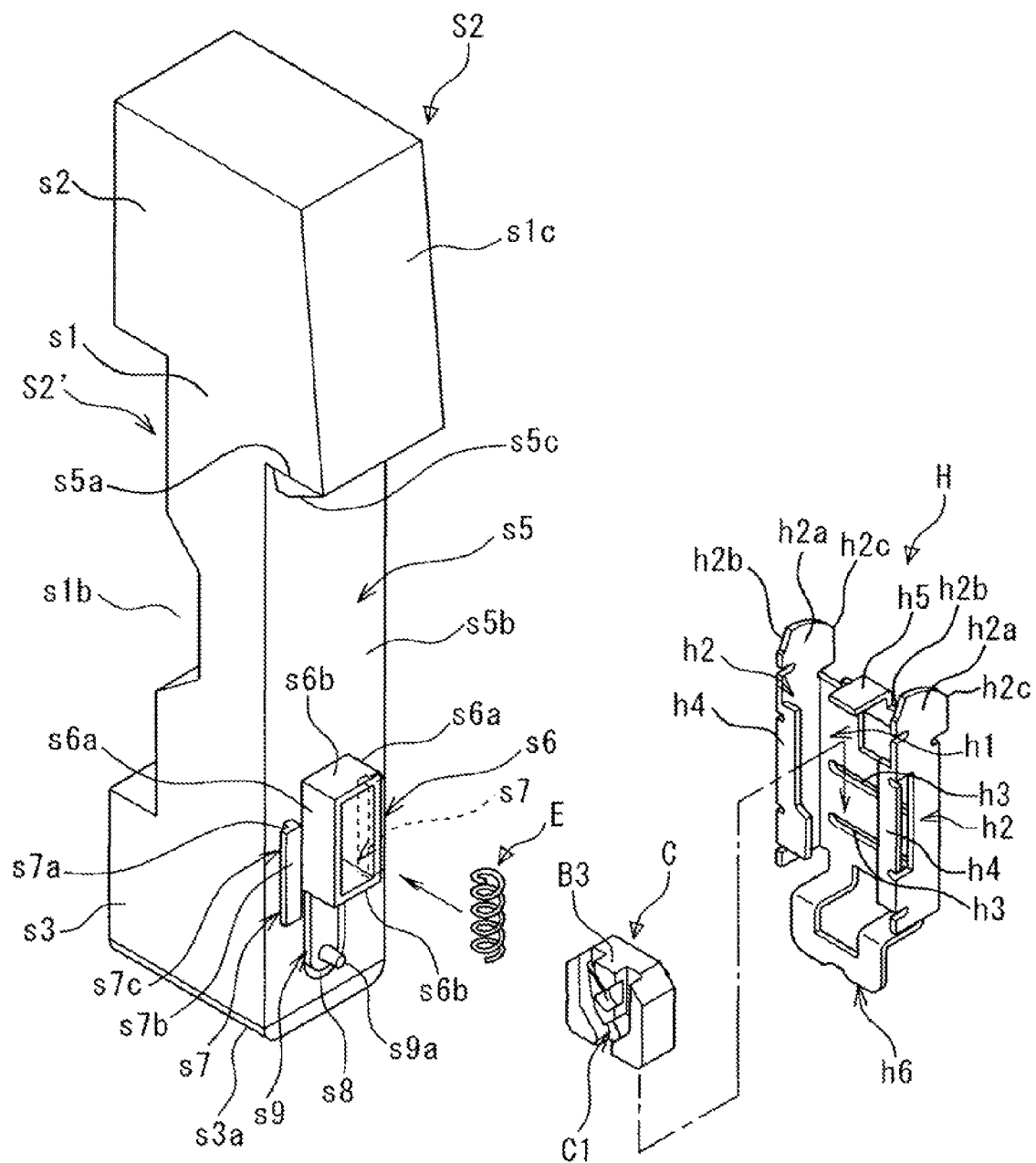
FIG. 3 is an exploded perspective view of a protector base unit, a coil spring, a cam member, and an operation member according to the present invention.
Figure 4:
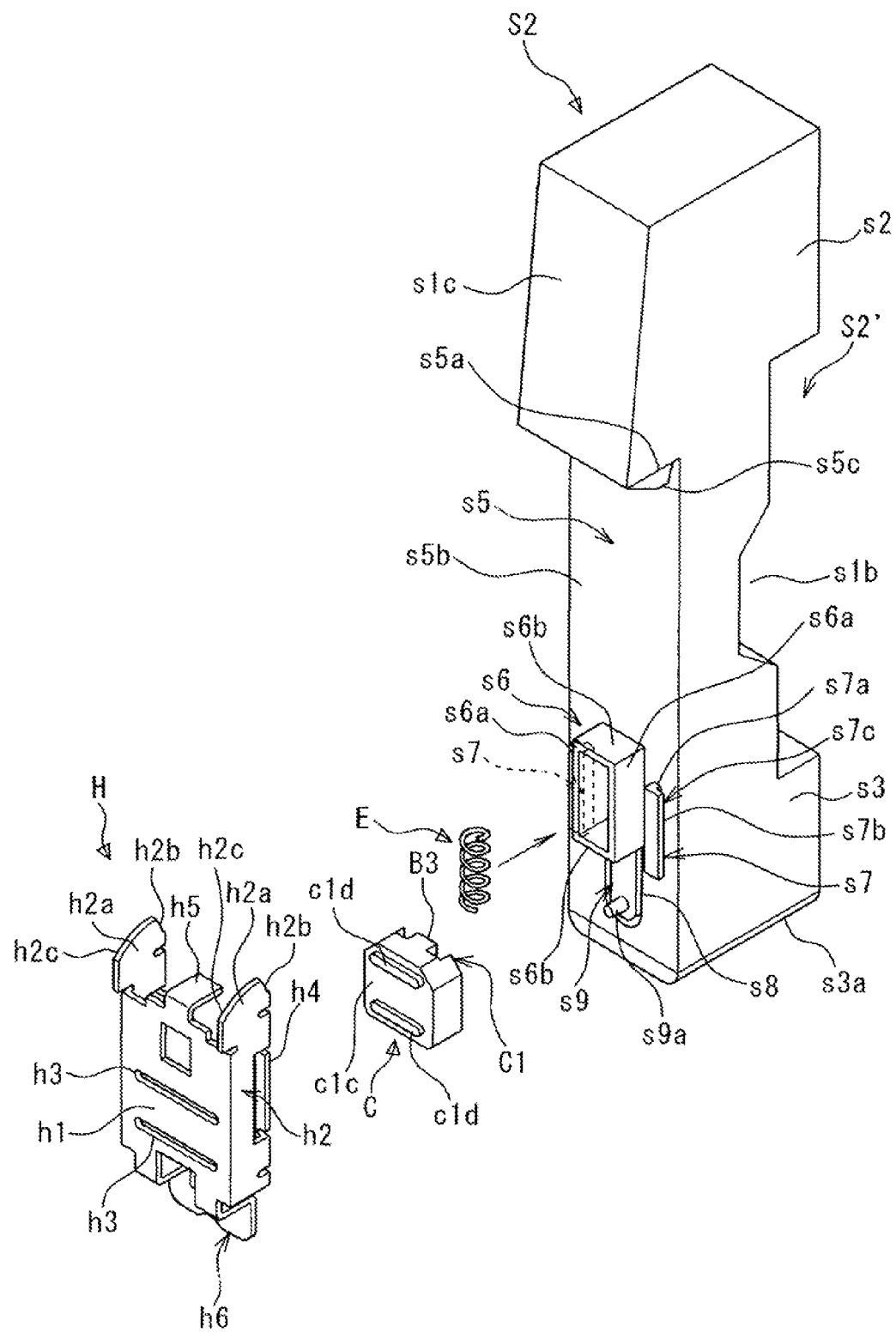
FIG. 4 is also an exploded perspective view of the protector base unit, the coil spring, the cam member, and the operation member according to the present invention.
Figure 5:
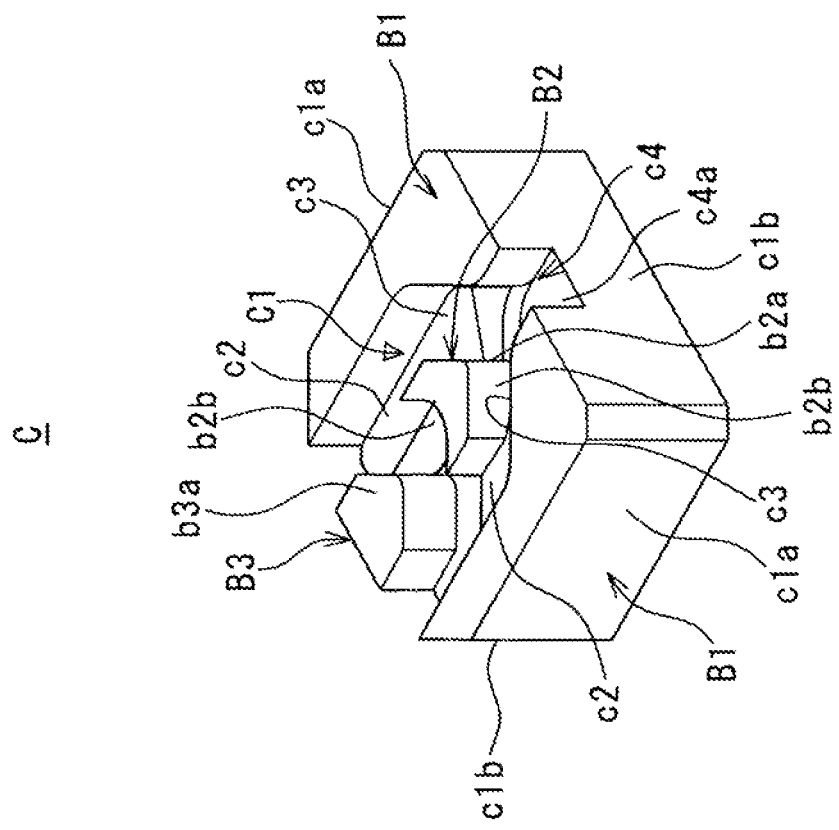
FIG. 5 is a perspective view of the cam member according to the present invention.

As shown, in FIG. 3 and FIG. 4, a coil spring accommodating portion s6 shaped like a box with an open top part is formed in a lower end area of the vertical surface s5b forming the step portion s5. Furthermore, on the vertical surface s5b, an engaging portion s7 is formed which includes a vertical, piece s7a extending along an opposite vertical sidewall s6a of the coil spring accommodating portion s6 and which is perpendicular to the vertical surface s5b and a parallel piece s7b extending from an upper end of the vertical piece s7a and away from the coil spring accommodating portion s6, the parallel piece s7b being parallel to the vertical surface s5b.

Furthermore, as shown in FIG. 3 and FIG. 4, a substantially H-shaped slit s8 is formed near a part of the vertical surface s5b positioned at one of the opposite horizontal sidewalls s6b of the coil spring accommodating portion s6 which sidewall s6b is located lower. With the substantially U-shaped slit s8 formed as described above, an elastically deformable elastic tongue piece s9 with a tip portion located away from the coil spring accommodating portion s8 is formed on the vertical surface s5b, and a cam pin s9a is provided so as to project from the tip portion of the elastic tongue piece s9.

Moreover, in FIG. 3 and FIG. 4, E is a coil spring disposed between the opposite horizontal sidewalls s6b of the coil spring accommodating portion s6. The coil spring E is compressively disposed in the coil spring accommodating portion s6.

Additionally, in FIG. 3 and FIG. 4, C is a cam member described below. The cam member C includes a cam groove C1 into which the cam pin s9a is inserted, which is provided so as to project from tins elastic tongue piece s9 formed on the vertical surface s5b of the above-described base unit S2.

Now, the cam member C with the cam groove C1 formed therein will be described with reference to FIG. 5 to FIG. 8.

The earn member C has a planar shape that is substantially like a square. The cam groove C1 defined in the cam member C is formed of a pair of parallel groove portions c2 that is parallel to an outer long-side vertical wall c1a of one of a pair of opposite outer cam blocks B1 with the same shape and an outer long-side vertical wall c1a of the other outer cam block B1, a pair of inclined groove portions c3 formed so as to extend to the vicinity of one of opposite outer short-side vertical walls c1b that are perpendicular to the outer long-side vertical walls c1a and so that the inclined groove portions c3 approach each other toward the one of the opposite outer short-side vertical, walls c1b, an end groove portion c4 extending parallel to the outer long-side vertical walls c1a from an area in which the opposite inclined groove portions c3 cross each other to the one of the outer short-side vertical walls c3, and a substantially V-shaped coupling groove portion c5 that couples substantially intermediate portions of the pair of parallel groove portions c2 (the coupling groove portion c5 is hereinafter simply referred to as the V-shaped coupling groove portion). A V-shaped tip portion of the V-shaped coupling groove portion c5 faces toward the one of the outer short-side vertical wall c1b.

Figure 6:
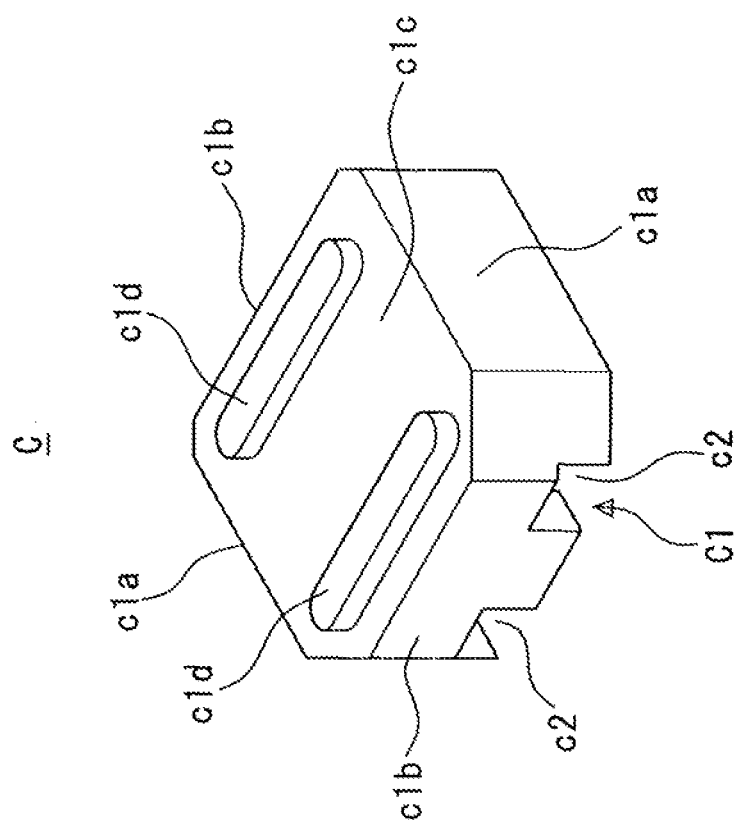
FIG. 6 is also a perspective view of the cam member according to the present invention.
Figure 7:
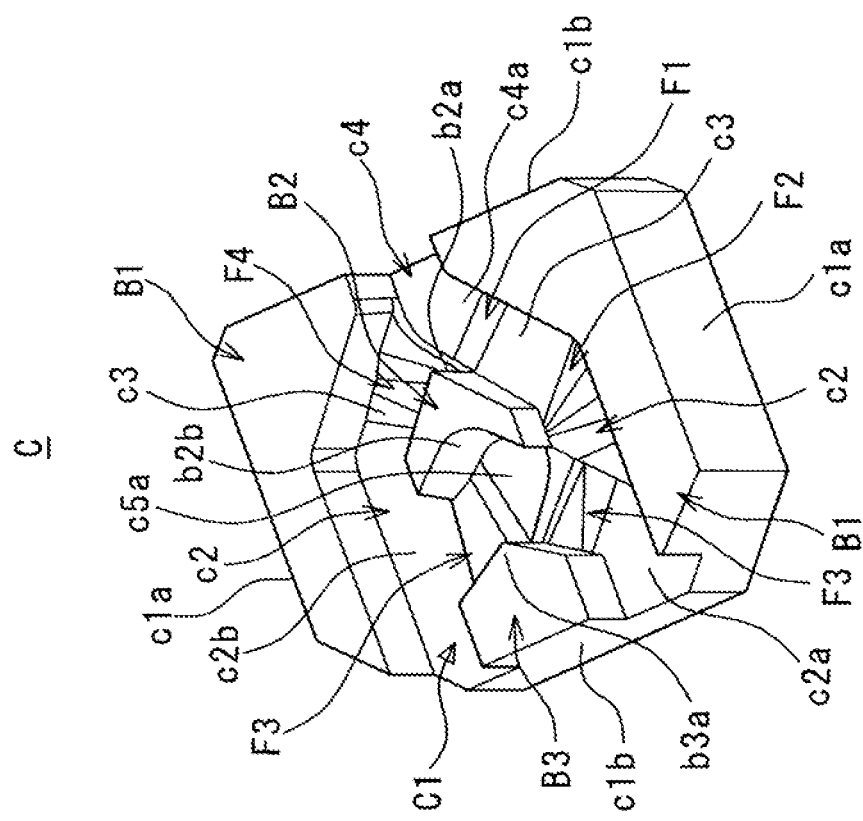
FIG. 7 is also a perspective view of the cam member according to the present Invention.
Figure 8:
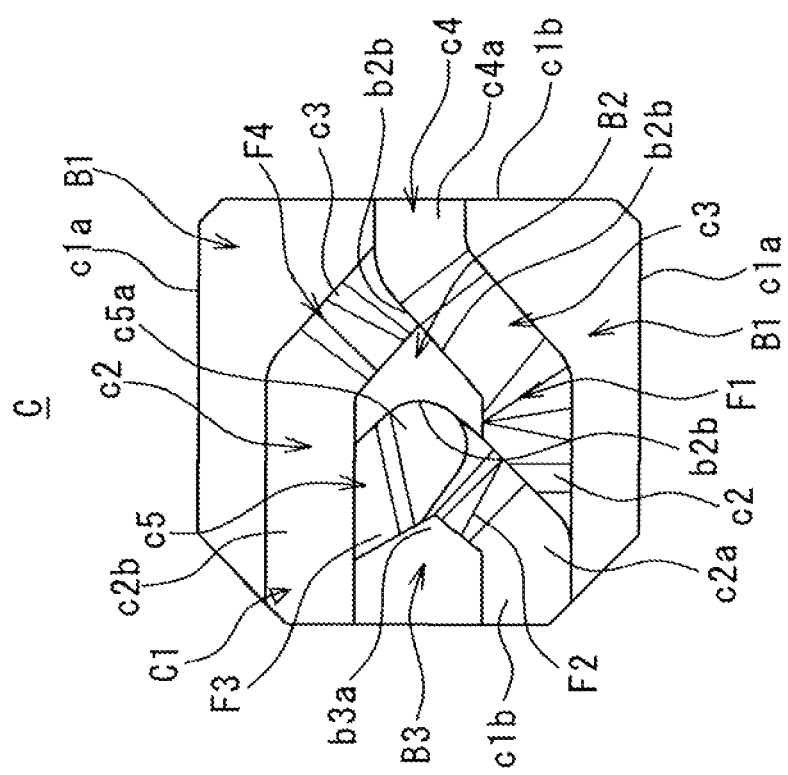
FIG. 8 is a plan view of the cam member according to the present invention.

Furthermore, the cam groove C1 is formed of a pair of opposite outer cam blocks B1 with the same shape, one central portion block B2 formed on a center line parallel to the outer long-side vertical rails c1a and substantially in a central portion of the cam member C, and an end block B3 formed also on the center line and close to the other outer short-side vertical wall c1b. The central portion block B2 is formed substantially line-symmetrically with respect to the center line so as to be substantially V-shaped. A pointed tip portion b2a of the central portion block B2 extends to the vicinity of the end groove portion c4. The central portion block B2 includes a fitting recess portion b2b formed on a side thereof closer to the end block B3. The end block B3 is also formed substantially line-symmetrically with respect to the center line so as to be shaped substantially like a pentagon. The end block B3 includes a pointed tip portion b3a formed on a side thereof closer to the central portion block B2 and opposite the fitting recess portion b2b formed in the central block B2. Additionally, as shown in FIG. 6, a pair of guide projections c1d parallel to the outer short-side vertical walls c1b is provided so as to project from a bottom surface c1c in which the cam groove C1 of the cam member C is not formed.

As described above, the cam groove C1 is formed of the pair of parallel groove portions c2, the pair of inclined groove portions c3, the end groove portion c4, and the V-shaped coupling groove portion c5. As described below, when the protector S is assembled, the cam pin s9a provided so as to project from the elastic tongue portion s9 formed on the vertical surface s5b of the base unit S2 is first fitted into the end groove portion c4 and then moved, by operation of an operation member H described below, from the end groove portion c4 via one of the pair of inclined groove portions c3 (the inclined groove located lower in FIG. 8) and along one of the pair of parallel groove portions c2 (the parallel groove portion located lower in FIG. 8) to the vicinity of the end of the one of the parallel groove portions c2. Moreover, the cam pin s9a is filled, via the V-shaped coupling groove portion c5, into the fitting recess portion b2b formed in the central portion block B2. With the cam pin s9a fitted in the fitting recess portion b2b formed in the central portion block B2, the protector S is in an unlocked state in which the protector S can be disengaged from the DIN rail R. In this state, operation of the operation, member H allows the cam pin s9a to slip out from the fitting recess portion b2b of the central portion block B2, and establishes a locked state in which the protector S is inhibited from being disengaged from the DIN rail R as described below.

Furthermore, a bottom surface c4a of the end groove portion c4 forming the cam groove C1 of the cam member C is formed to be flat, and the vicinity of end of one of the parallel groove portions c2 (the parallel groove portion located lower in FIG. 8) is also formed to be flat and the same as the bottom surface c4a of the end groove portion c4 in height. A bottom surface extending from the end groove portion c4 to the vicinity of end of the one of the parallel groove portions c2 is formed to be an upgrade surface F1 inclined toward a bottom surface c2a located in the vicinity of end of the one of the parallel groove portions c2. Additionally, a bottom surface c5a located near the fitting recess portion b2b of the central portion block B2 in the V-shaped coupling groove portion c5 (the bottom surface c5a is hereinafter referred to as the central surface of the V-shaped coupling groove portion c5) is also formed to be flat and the same in height as the bottom surface c4a of the end groove portion c4 and the bottom surface c2a located near the end of the one of the parallel groove portions c2. A bottom surface extending from the bottom surface c2a located near the end of the one of the parallel groove portions c2 to the central bottom surface c5a of the V-shaped coupling groove portion c5 is formed to be an upgrade surface F2 inclined toward the central bottom surface c5a of the V-shaped coupling groove portion c5. Moreover, a bottom surface c2b of the other parallel groove portion (the parallel groove portion located higher in FIG. 8) c2 is formed to be flat and the same in height as the bottom portion c4a of the end groove portion c4, the bottom surface c2a located near the end of the one of the parallel groove portions c2, and the central bottom surface c5a of the V-shaped coupling groove portion c5. A bottom surface extending from the central bottom surface c5a of the V-shaped coupling groove portion c5 to the bottom surface c2b of the other parallel groove portion c2 is formed to be an upgrade surface F3 inclined toward the bottom surface c2b of the other parallel groove portion c2. Moreover, a bottom surface of the other inclined groove portion (the inclined groove portion positioned higher in FIG. 8) c3 positioned between the bottom surface c2b of the other parallel grove portion c2 and the bottom surface c1a of the end groove portion c4 is also formed to be an upgrade surface F4 inclined toward the bottom surface c4 a of the end groove portion c4.

Figure 9:
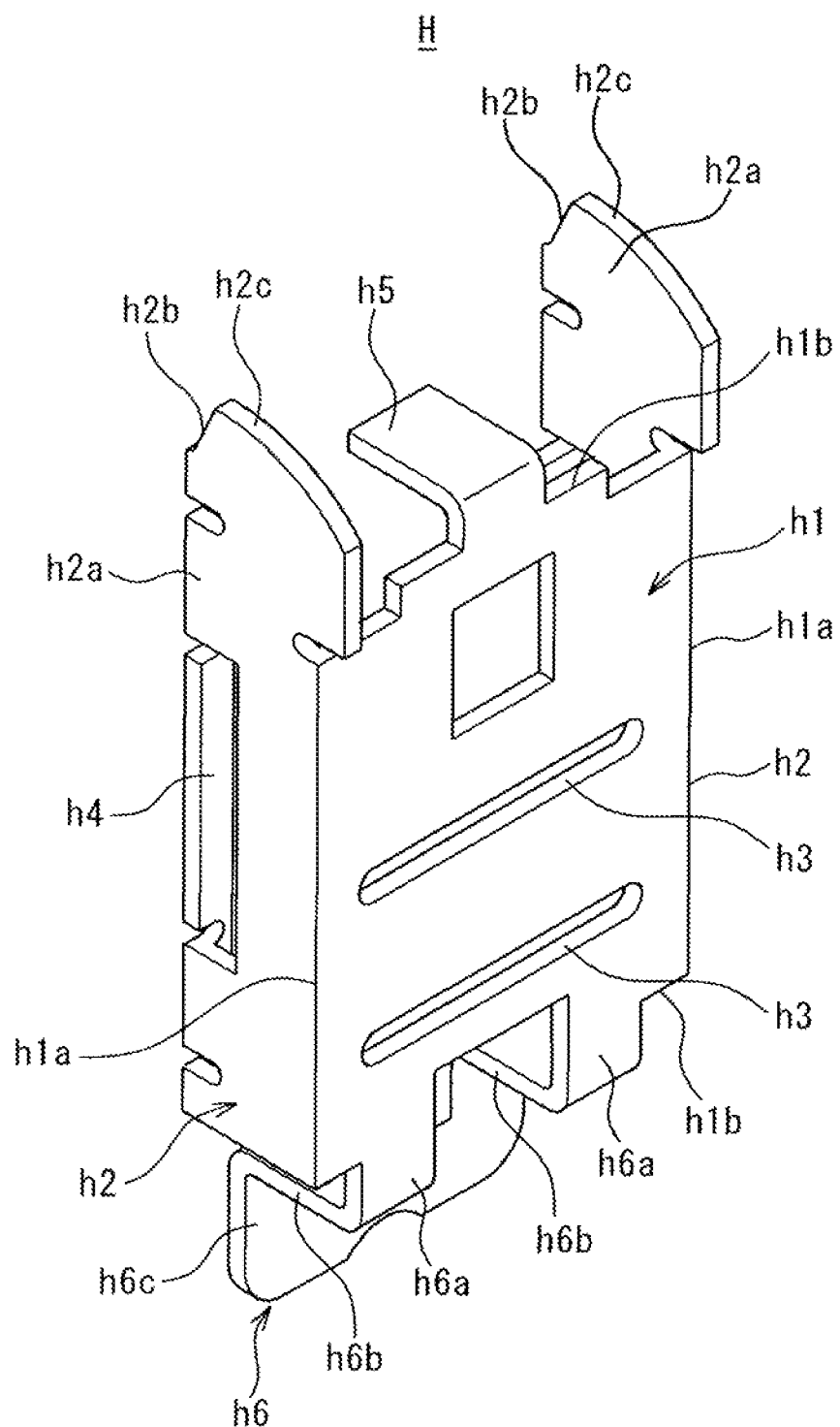
FIG. 9 is a perspective view of the operation member according to the present invention.
Figure 10:
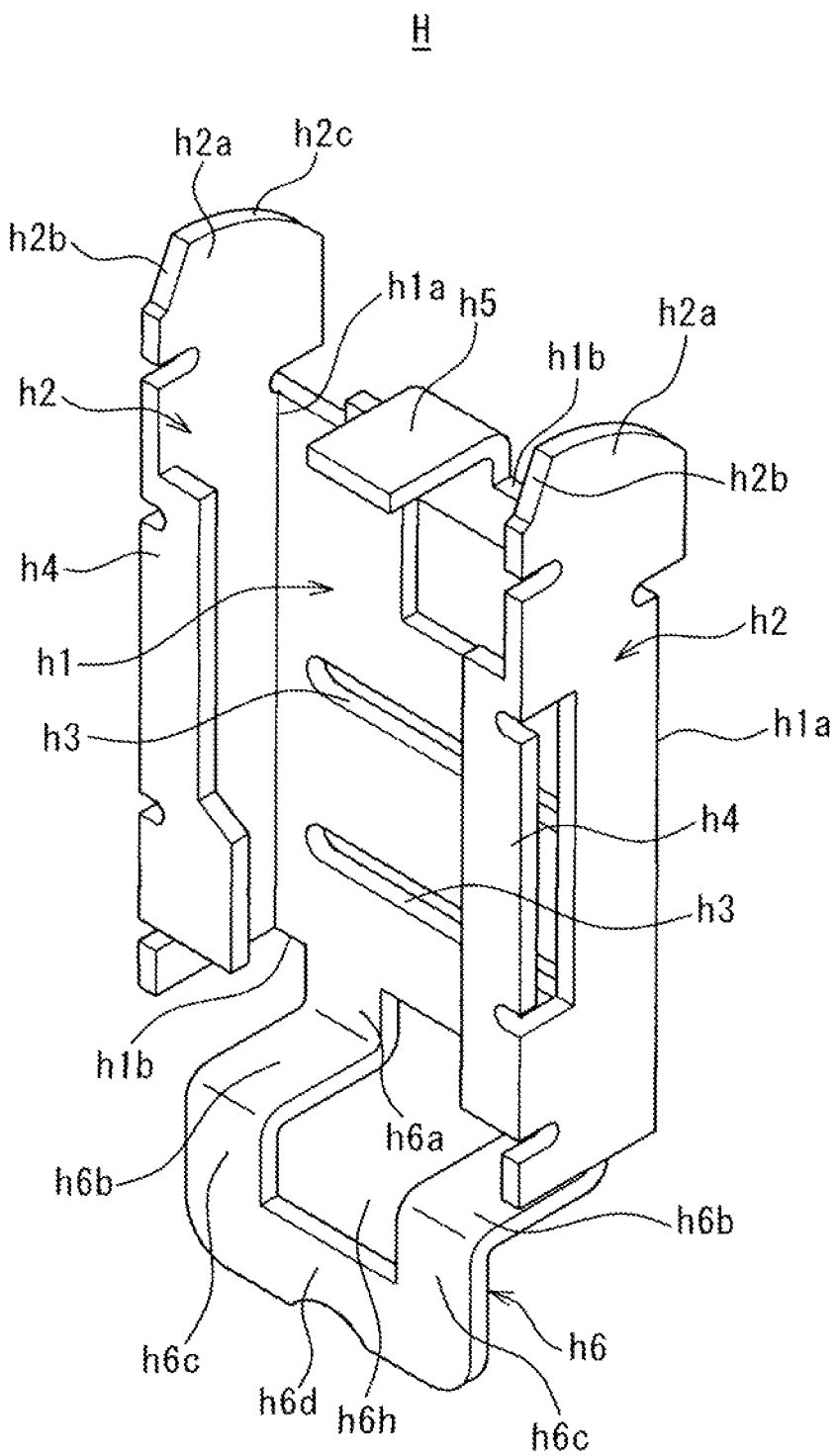
FIG. 10 is also a perspective view of the operation member according to the present invention.

Now, the operation member H will be described with reference to FIG. 9 and FIG. 10.

The operation member H is formed of a plate portion h1 and opposite long-side sidewall portions h2 suspended from opposite long sides h1a of the plate portion h1. The plate portion h1 includes guide slits h3 formed therein which is substantially perpendicular to the opposite long sides h1a and into which the above-described pair of guide projections c1d of the cam member C is fitted.

In a central portion of a lower end of each of the above-described opposite long-side sidewall portions h2, a corresponding one of opposite guide pieces h4 is formed which is substantially perpendicular to the corresponding long-side sidewall portion h2 and parallel to the plate portion h1 and which extends toward the plate portion h1. The guide piece h4 is configured so as to be inserted in to the guide recess portion s7c formed of the vertical piece s7a and parallel piece s7b of the engaging portion s7 formed on the base unit S2 and the vertical surface s5b formed on the base unit S2, when the protector S is assembled.

Such locking projecting pieces h2a as project from one of the opposite short sides h1b of the plate portion h1 are each formed at one end of the corresponding one of the pair of long-side sidewall portions h2. Furthermore, the locking projecting piece h2a includes an inclined portion h2b formed by removing a corner portion of locking projecting piece h2a positioned closer to the guide piece h4. Moreover, a coil spring receiving piece h5 which is perpendicular to the plate portion h1 and which extends along the long-side sidewall portion h2 is formed in a central portion of one of the short sides h1b. The coil spring receiving piece h5 comes into abutting contact with one end of the coil spring E accommodated in the coil spring accommodating portion s6. Additionally, a grip portion h6 is formed on the other of the opposite short side walls h1b. The grip portion h6 is formed of upper vertical portions h6a provided near the respective opposite ends of the other side wall h1b and extending from the plate portion h1, horizontal portions h6b each extending from a lower end of the upper vertical portion h6a and away from the plate portion h1, lower vertical portions h6c each extending downward from a tip of the horizontal portion h6b, and a bridging portion h6d that couples the lower vertical portions h6c together. The grip portion h6 includes a window portion h6b formed therein into which an operator's fingernail or a tip portion of an operation bar or the like can be inserted.

Now, mounting of the coil spring E, the cam member C, and the operation member H on to the base unit S2 of the protector S will be described with reference to FIG. 3, FIG. 4, FIG. 11, and FIG. 12.

Figure 11:
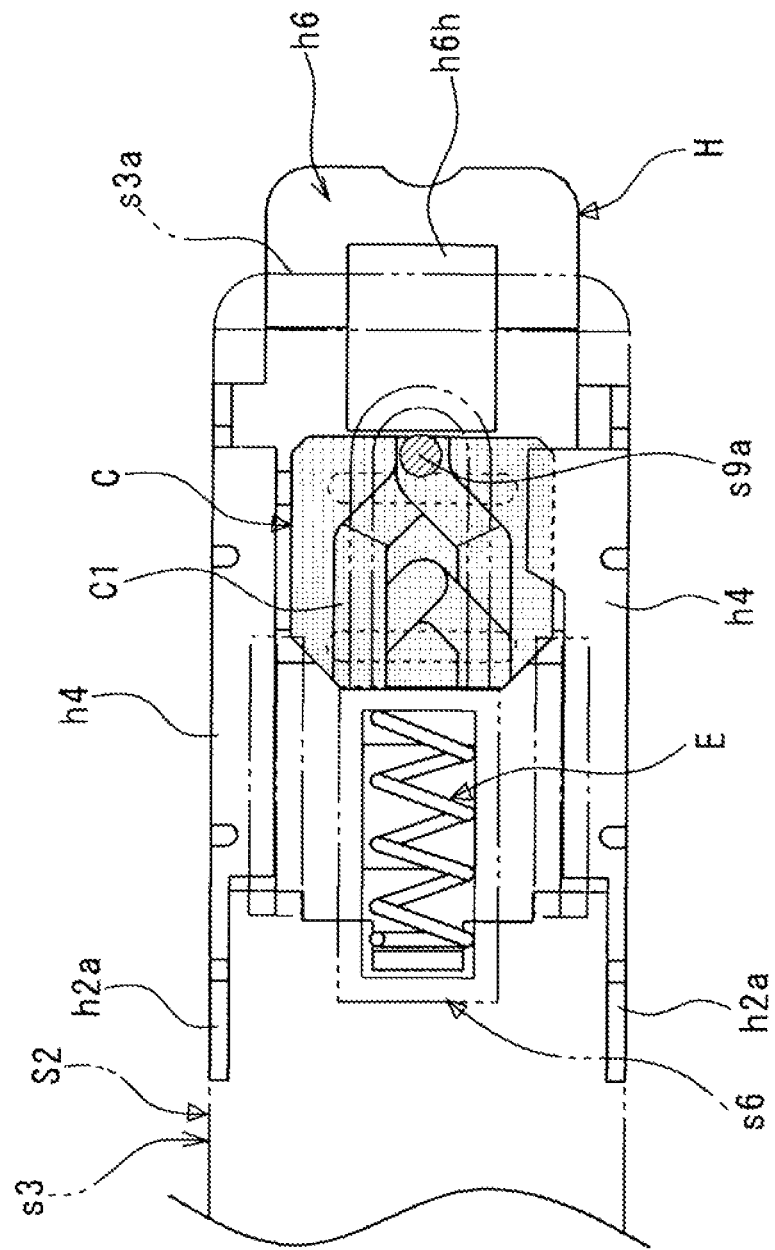
FIG. 11 is a plan view showing the positional relationship between the cam member and a cam pin inserted into a cam groove of the cam member according to the present invention.

The coil spring E is placed in the coil spring accommodating portion s6 parallel to the opposite vertical side walls s6a of the coil spring accommodating portion s6. Furthermore, the base unit S2 and the cam member C are arranged such that the cam groove C1 of the cam member C is inserted over the cam pin s9a of the elastic tongue piece s9 formed on the vertical surface s5b of the base unit S2 and such that the end block B3 formed on the cam member C is positioned on the side of the coil spring accommodating portion s6. Moreover, the coil spring receiving piece h5 of the operation member H is attached by insertion between one of the opposite horizontal sidewalls s6b of the coil spring accommodating portion s6 which is located higher and the upper end of the coil spring E accommodated in the coil spring accommodating portion s8. The guide pieces h4 of the operation member H is inserted into the respective guide recess portions s7c formed on the base unit c. Additionally the pair of guide projections c1d formed on the bottom surface c1c of the cam member C is fitted into the pair of guide slits h3 formed in the plate portion h1 of the operation member H. Thus, the protector S is assembled as shown in FIG. 2. Furthermore, when the protector S is assembled, a part of the window portion h6b formed in the grip portion h6 of the operation member H is positioned under the bottom surface s3a of the lower horizontal portion s3 forming the base unit S2. Moreover, when the protector S is assembled, the cam pin s9a of the elastic tongue piece s9 is positioned in the end groove port ion c4 of the cam member C as shown in FIG. 11.

Figure 12:
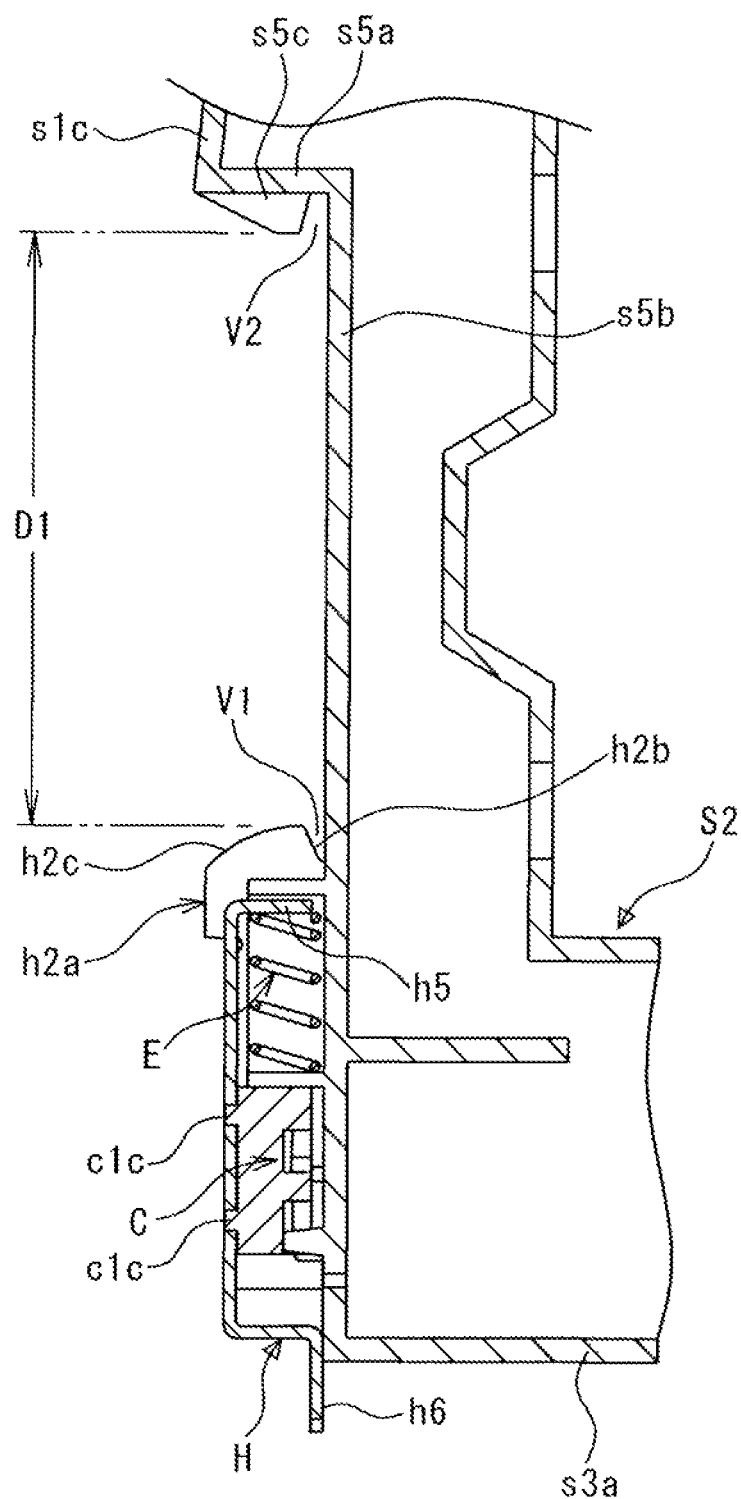
FIG. 12 is a partial vertical sectional view taken along a longitudinal direction of the protector base unit according to the present invention.

When the protector S is assembled, a lower gap V1 is formed between the inclined portion h2b formed on each of the locking projecting pieces h2a of the operation member H and the vertical surface s5b of the base unit S2 so that the lower vertical locking portion r3 of the DIN rail R is inserted into the lower gap V1, as shown in FIG. 12. Furthermore, an upper gap V2 is formed between the fixed locking projecting portion s5c suspended from the upper end horizontal surface s5a of the base unit 2 and the vertical surface s5b so that the upper vertical locking portion r2 of the DIN rail R is inserted into the upper gap V2.

Figure 13:
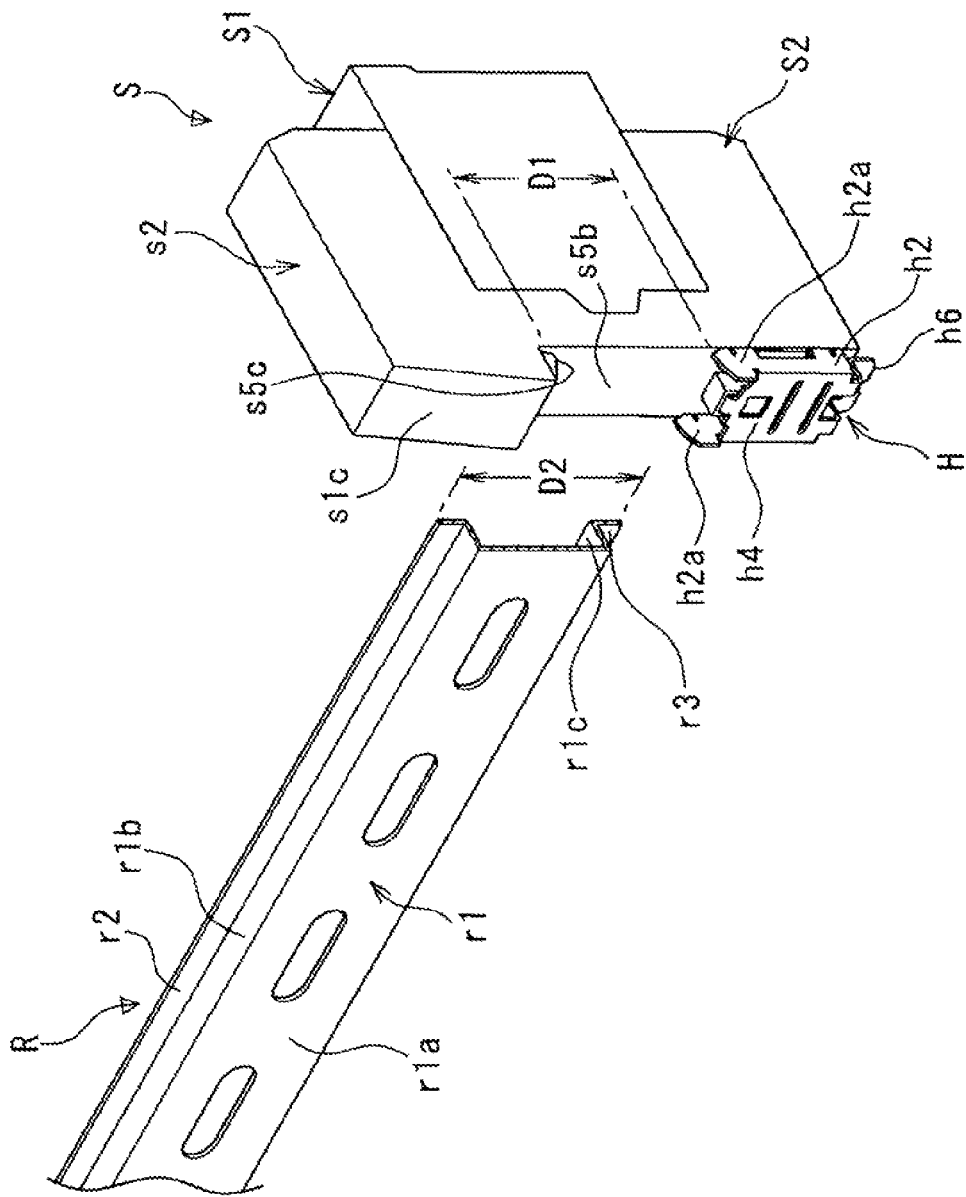
FIG. 13 is a perspective view showing that the protector according to the present invention has been removed from the DIN rail.

Before the protector S is mounted on the DIN rail R, the distance Da between the fixed locking projecting portion s5c of the base unit S2 and the locking projecting piece h2a of the operation member H is shorter than the height of the DIN rail R (the distance from the upper end of the upper vertical locking portion r2 to the lower end of the lower vertical locking portion r3 of the rail main body r1) (see FIG. 12 and FIG. 13).

Now, with reference to FIG. 13 to FIG. 16, the positional relationship between the cam groove C1 of the cam groove C1 of the cam member C and the cam pin 9a inserted in the cam groove C1 will be described which relationship is observed in an unlocked state in which the protector S can be disengaged from the DIN rail R and in a locked state in which the protector S is inhibited from being disengaged from the DIN rail R.

With the protector S not mounted on the DIN rail R, the cam pin s9a of the elastic tongue piece s9 is positioned in the end groove portion c4 as shown in FIG. 11.

As shown in FIG. 13, with the vertical surface s5b of the base unit S2 of the protector S located away from the DIN rail R, the protector S is moved toward the DIN rail R. First, the upper vertical locking portion r2 of the DIN rail R is inserted into the upper gap V2. Then, the lower vertical locking portion r3 of the DIN rail R is brought into abutting contact with arcuate inclined portion h2c of the operation member H. Moreover, when the lower vertical locking portion r3 of the DIN rail R is moved toward the vertical surface s5b of the base unit S2, the lower vertical locking portion r3 of the DIN rail R moves the operation member H downward (rightward in FIG. 14 to FIG. 16) because the distance D1 between the fixed locking projecting portion s5c formed on the base unit S2 and the locking projecting piece h2a formed on the operation member H is set shorter than the distance of the DIN rail R as described above. The downward movement of the operation member H, in other words, the movement of the operation member H toward the hot torn surface s3a of the base unit S2, causes downward movement of the coil spring receiving piece h5 of the operation member H attached by insertion between one of the horizontal sidewalls s6b of the coil spring accommodating portion s6 which is located higher and the upper end of the coil spring E accommodated in the coil spring accommodating portion s6, with the simultaneous compression of the coil spring E by the coil spring receiving piece h5. Then, when the locking projecting pieces h2a of the operation member H moves across the lower vertical locking portion r3 of the DIN rail R, the coil spring E exerts a restoring force to raise the operation member H (leftward in FIG. 14 to FIG. 16), thus inserting the lower vertical locking portion r3 formed on the DIN rail R Into the lower gap V1 formed between each of the inclined portions h2b of the operation member H and vertical surface s5b of the base unit S2. Thus, as shown in FIG. 1, the protector S is mounted on the DIN rail R.

Figure 14:
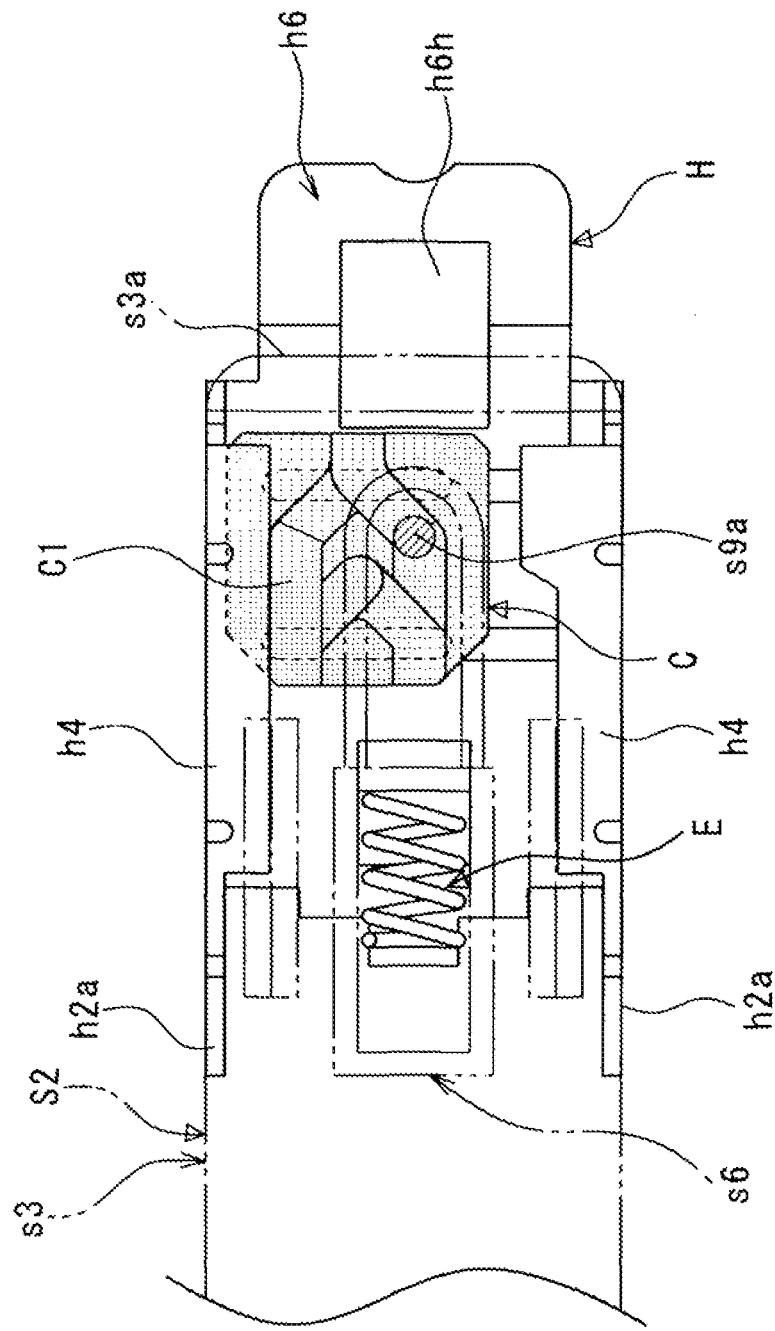
FIG. 14 is a plan view showing the positional relationship between the cam member and the cam pin inserted into the cam groove of the cam member according to the present invention.

As described above, during a process in which the protector S is mounted on the DIN rail R, the cam member C moves upward (toward one of the long-side side wall portions h2) as shown in FIG. 11 and FIG. 14, with the guide projections c1c of the cam member C fitted in the respective guide slits h3 in the operation member H being guided through the guide slits h3. In the state shown in FIG. 14, the cam pin s9a inserted, in the cam groove C1 is positioned near the boundary between one of the pair of inclined groove portions c3 (the inclined groove portion c3 located lower in FIG. 14) and one of the parallel groove portions c2 (the parallel groove portion c2 positioned lower in FIG. 14). As shown in FIG. 14, the state in which the cam pin s9a is positioned near the boundary between the one of the pair of inclined groove portions c3 and the one of the parallel groove portions c2 is the locked state in which the protector S is inhibited from being disengaged from the DIN rail R. When the cam pin s9a is inserted from the end groove portion c4 into one of the inclined groove portions c3, the cam pin s9a is inserted into the inclined groove portion c3 along the inclined side surface b2b (see FIG. 5 and FIG. 8) positioned in the lower part of the central portion block B2. This configuration allows the cam member C to move smoothly with respect to the cam pin s9a.

Figure 15:
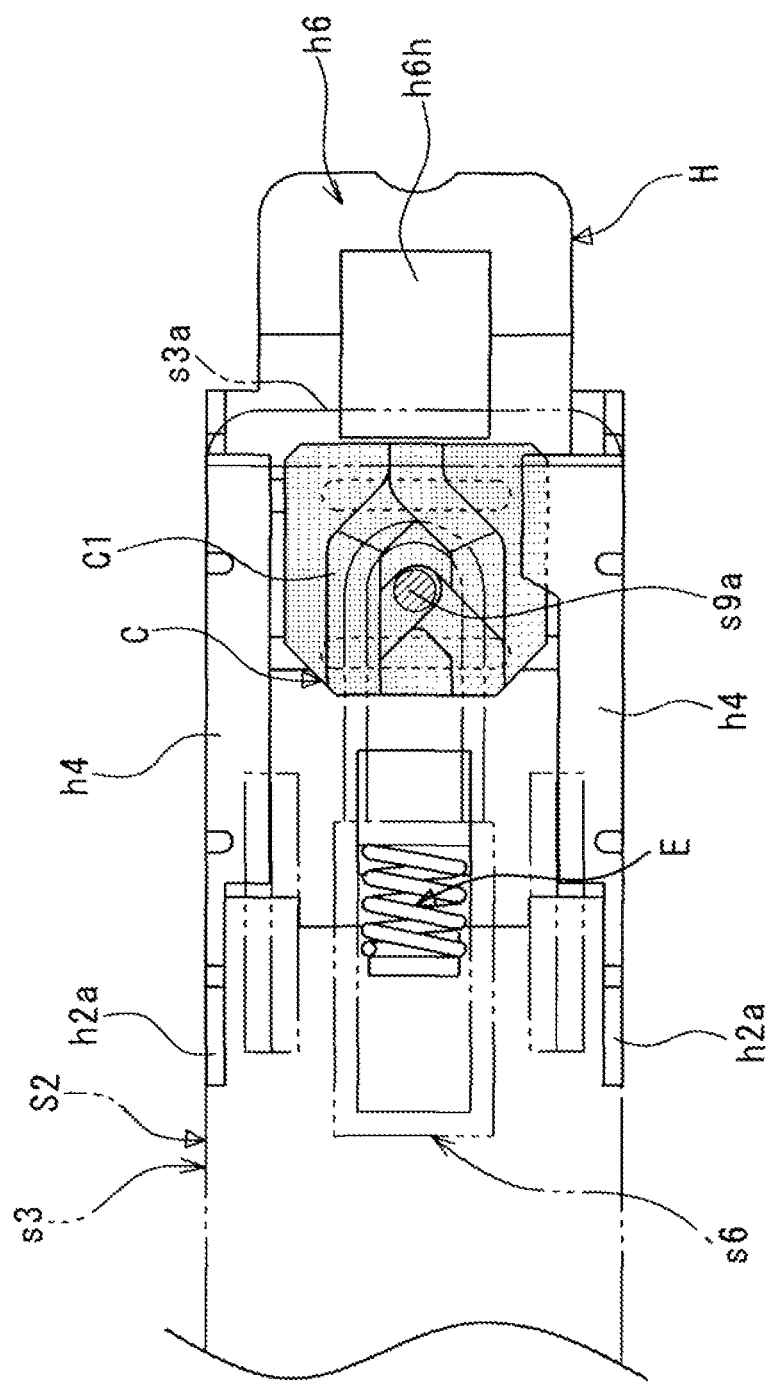
FIG. 15 is also a plan view showing the positional relationship between the cam member and the cam pin inserted into the cam groove of the cam member according to the present invention.

To remove the protector S mounted on the DIN rail R (the state shown in FIG. 14), the operation member H is moved downward (rightward in FIG. 14), in other words, the grip portion h6 of the operation member H is moved away from the bottom surface s3a of the base unit S2. Thereafter, the cam member C moves toward the bottom surface s3a of the base unit S2 (rightward in FIG. 14) along the cam pin s9a inserted in the cam groove C1. The cam pin s9a moves from a position near the boundary between the one of the inclined groove portions c3 and the one of the parallel groove portions c2 along the upgrade inclined surface F1 of the one of the parallel groove portions c2 and is then positioned on the flat bottom surface c2a located near the end of the one of the parallel groove portions c2. Thereafter, the earn pin s9a passes over the upgrade inclined surface F2 formed in the V-shaped coupling groove portion c5 and is then positioned on the central bottom surface c5a of the V-shaped coupling groove portion c5 located near the fitting recess portion b2b of the central portion block B2, as shown in FIG. 15. As described above, the grip portion h6 of the operation member H moves away from the bottom surface s3a of the base unit S2 to make the distance D1 larger than the height D2 of the DIN rail R. This distance D1 is maintained to enable the lower vertical locking portion r3 of the DIN rail R to be discharged from the lower gap V1. Thereafter, the protector S is moved away from the upper vertical locking portion r2 of the DIN rail R to discharge the upper vertical locking portion r2 of the DIN rail R from the upper gap V2, thus allowing the protector S to be removed from the DIN rail R. That is, the state in which the cam pin s9 is positioned on the central bottom surface c5a is the unlocked state in which the protector S can be removed from the DIN rail R.

In the unlocked state in which the protector S can be removed from the DIN rail R, to mount the protector S on the DIN rail R, first, the upper vertical locking portion r2 formed on the DIN rail R is inserted into the upper gap V2 formed between the fixed locking projecting portion s5c and vertical surface s5b formed on the base unit S2 of the protector S, and the lower vertical locking portion r1 of the DIN rail R is brought into contact with the vertical surface s5b of the base unit S2. In the unlocked state, the grip portion h6 of the operation member H is further moved away from the bottom surface s3a of the base unit S2.

Figure 16:
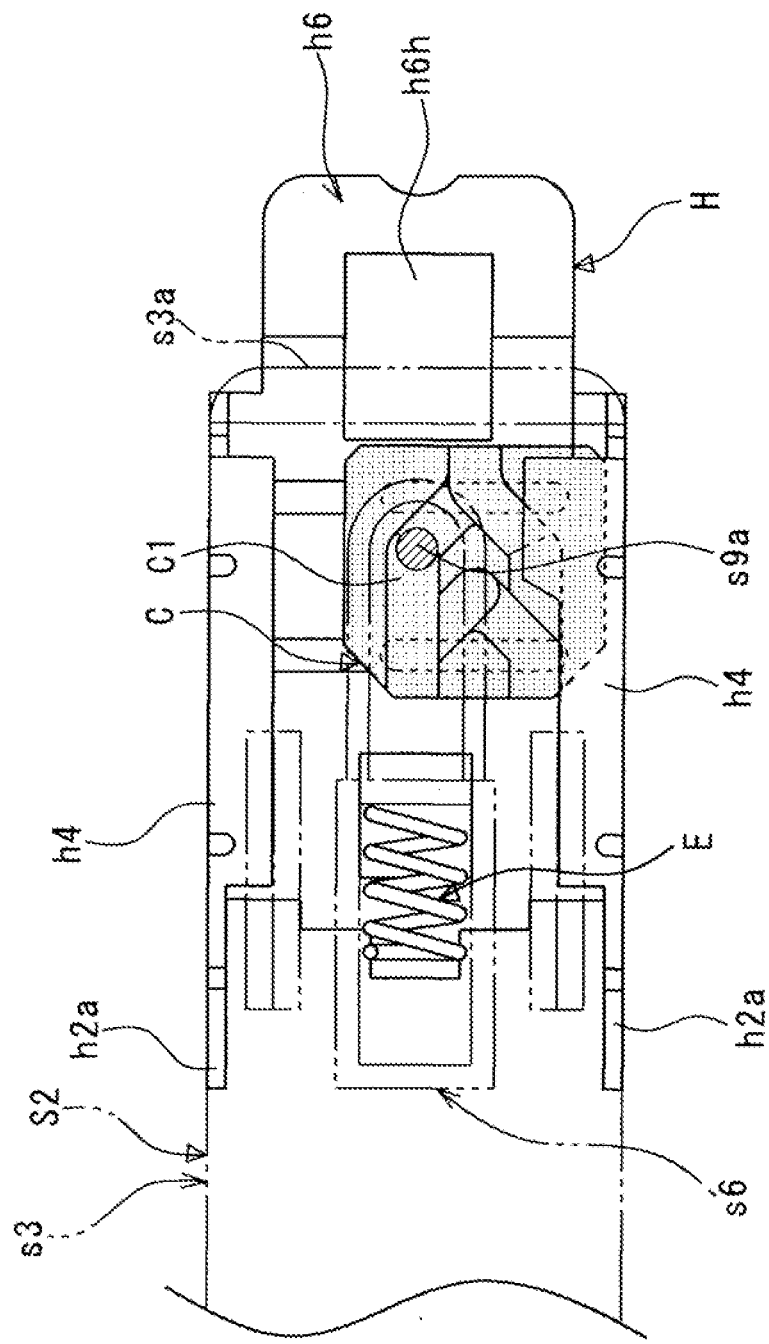
FIG. 16 is also a plan view showing the positional relationship between the cam member and the cam pin inserted into the cam groove of the cam member according to the present invention.

Then, the cam pin s9a slips out from the central bottom surface c5a and moves a long the upgrade inclined surface F3 of the V-shaped coupling groove portion c5 and over the bottom surface c2b of one of the pair of parallel groove portions c2 (the parallel groove portion c2 located higher In FIG. 14). Then, as shown in FIG. 16, the cam pin s9a is positioned near the boundary between the other inclined groove portion c3 (the inclined groove portion c3 located higher in FIG. 16) and the other parallel groove portion c2 (the parallel groove portion c2 located higher in FIG. 16). When the cam pin s9a is thus positioned near the boundary between the other inclined groove portion c3 and the other parallel groove portion c2, the lower vertical locking portion r3 of the DIN rail R is inserted into the lower gap V1, leading to the locked state in which the protector S is mounted on the DIN rail R as shown in FIG. 1.

As described above, with the protector S not mounted on the DIN rail R, the cam pin s9a of the elastic tongue piece s9 is positioned in the end groove portion c4 of the cam groove C1 of the cam member C as shown in FIG. 11. In this state, when the protector S is mounted on the DIN rail R, the locked state is established in which, as shown in FIG. 14, the cam pin is positioned near the boundary between one of the pair of inclined groove portions c3 (the inclined groove portion c3 located lower in FIG. 14) and one of the parallel groove portions c2 (the parallel groove portion c2 positioned lower in FIG. 14), with the protector S mounted on the DIN rail R. Furthermore, in the locked state, the operation member H is operated to position the cam pin s9a on the central bottom surface c5a of the V-shaped coupling groove portion c5 located near the fitting recess portion b2b of the central portion, block B2, leading to the unlocked state in which the protector S can be removed from the DIN rail R. Moreover, in this state, the operation member H is operated to establish the locked state in which the cam pin s9a is positioned near the boundary between the other inclined, groove portion c3 (the inclined groove portion c3 located higher in FIG. 16) and the other parallel groove portion c2, with the protector S mounted on the DIN rail R, as shown in FIG. 16. Thus, the cam pin s9a constantly moves in one direction in the cam groove C1 of the cam member C.

As described above, the cam pin s9a provided so as to project from the tip portion of the elastic tongue piece s9 formed on the base unit S2 of the protector S is inserted into the cam groove C1 of the cam member C disposed between the base unit S2 and the operation member H, and the operation member H is moved in the direction in which the operation member H moves away from or closer to the lower horizontal portion s3 of the base unit S2 to move the cam member C, thus moving the cam pin s9a between the locked position at which the cam pin s9a is positioned near the boundary between the inclined groove portion c3 and the parallel groove portion c2 of the cam groove C1 of the cam member C to inhibit the protector S from being disengaged from the DIN rail R and the unlocked position at which the cam pin s9a is positioned on the central bottom surface c5a of the V-shaped coupling groove portion c5 of the cam groove C1 of the cam member C to enable the protector S to be disengaged from the DIN rail R. Hence, at the unlocked position where the protector S can be disengaged from the DIN rail R, the cam pin s9a is prevented from slipping out from the central bottom surface c5a of the V-shaped coupling groove portion c5 of the cam groove C1 of the cam member C. Therefore, the operation of removing the protector S from the DIN rail R can be easily and quickly performed without the need to operate the operation member H.

Furthermore, the guide projection, c1d formed on the cam member C is fitted into the guide slit h3 formed in the planar portion h1 of the operation member H.

Thus, the cam member C can be smoothly and stably moved toward each of the opposite long-side sidewall portions h2 of the operation member H.

Moreover, the coil sprig receiving piece h5 of the operation member H is arranged at the upper end of the coil spring E compressively accommodated in the coil spring accommodating portion s6. Hence, the operation member H can be smoothly moved, thus improving the operability of the operation member H.

Additionally, the guide piece h4 formed on the operation member H is inserted into the guide recess portion s7e formed by the vertical surface s5b of the base unit 52 of the protector S and the vertical piece s7a and the parallel piece s7b of the engagement portion s7 formed on the vertical surface s5b. Thus, the operation member H can be smoothly and stably moved.

The invention claimed is:

1. A device for mounting a protector on a DIN rail characterized by being configured such that a cam pin provided so as to project from a tip portion of an elastic tongue piece formed on a base unit of the protector is inserted into a cam groove of a cam member disposed between the base unit and an operation member, and the operation member is moved in a direction in which the operation member moves away from or closer to a lower horizontal portion of the base unit to move the cam member, thus moving the cam pin between a locked position at which the cam pin is positioned near a boundary between a inclined groove portion and a parallel groove portion of the cam groove of the cam member to inhibit the protector from being disengaged from the DIN rail and a unlocked position at which the cam pin is positioned on a central bottom surface of a V-shaped coupling groove portion of the cam groove of the cam member to enable the protector to be disengaged from the DIN rail.

2. A device for mounting a protector on a DIN rail characterized by being configured such that by means of a mechanism in which when a cam pin provided so as to project from a tip portion of an elastic tongue piece formed on a base unit of the protector is inserted into a cam groove of a cam member disposed between the base unit and an operation member and the operation member is moved in a direction in which the operation member moves away from or closer to a lower horizontal portion of the base unit, then the cam member moves and the cam pin moves in one direction along the cam groove of the cam member in a circling manner, the operation member can be held at the unlocked position at which the protector can be disengaged from the DIN rail.

3. The device for mounting the protector on the DIN rail according to claim 1, characterized in that a guide projection formed on the cam member is fitted into a guide slit formed in a planar portion of the operation member.

4. The device for mounting the protector on the DIN rail according to claim 1, characterized in that a coil sprig receiving piece of the operation member is arranged at an upper end of a coil spring compressively accommodated in a coil spring accommodating portion.

5. The device for mounting the protector on the DIN rail according to claim 1, characterized in that a guide piece formed on the operation member is inserted into a guide recess portion formed by a vertical surface of the base unit of the protector and a vertical piece and a parallel piece of an engagement portion formed on the vertical surface.

6. The device for mounting the protector on the DIN rail according to claim 2, characterized in that a guide projection formed on the cam member is fitted into a guide slit formed in a planar portion of the operation member.

7. The device for mounting the protector on the DIN rail according to claim 2, characterized in that a coil sprig receiving piece of the operation member is arranged at an upper end of a coil spring compressively accommodated in a coil spring accommodating portion.

8. The device for mounting the protector on the DIN rail according to claim 3, characterized in that a coil sprig receiving piece of the operation member is arranged at an upper end of a coil spring compressively accommodated in a coil spring accommodating portion.

9. The device for mounting the protector on the DIN rail according to claim 2, characterized in that a guide piece formed on the operation member is inserted into a guide recess portion formed by a vertical surface of the base unit of the protector and a vertical piece and a parallel piece of an engagement portion formed on the vertical surface.

10. The device for mounting the protector on the DIN rail according to claim 3, characterized in that a guide piece formed on the operation member is inserted into a guide recess portion formed by a vertical surface of the base unit of the protector and a vertical piece and a parallel piece of an engagement portion formed on the vertical surface.

11. The device for mounting the protector on the DIN rail according to claim 4, characterized in that a guide piece formed on the operation member is inserted into a guide recess portion formed by a vertical surface of the base unit of the protector and a vertical piece and a parallel piece of an engagement portion formed on the vertical surface.

* * * * *